United States Patent
Bosnjakovic et al.

(10) Patent No.: US 11,580,560 B2
(45) Date of Patent: Feb. 14, 2023

(54) IDENTITY RESOLUTION FOR FRAUD RING DETECTION

(71) Applicant: Intuit Inc., Mountain View, CA (US)

(72) Inventors: Dusan Bosnjakovic, Los Angeles, CA (US); Peter Benjamin Twieg, Woodland Hills, CA (US)

(73) Assignee: Intuit Inc., Mountain View, CA (US)

( * ) Notice: Subject to any disclaimer, the term of this patent is extended or adjusted under 35 U.S.C. 154(b) by 161 days.

(21) Appl. No.: 16/691,466

(22) Filed: Nov. 21, 2019

(65) Prior Publication Data

US 2021/0019762 A1   Jan. 21, 2021

Related U.S. Application Data

(60) Provisional application No. 62/876,584, filed on Jul. 19, 2019.

(51) Int. Cl.
| | |
|---|---|
| *G06Q 30/00* | (2012.01) |
| *G06Q 30/018* | (2023.01) |
| *G06N 20/00* | (2019.01) |
| *G06F 16/901* | (2019.01) |
| *G06Q 40/02* | (2023.01) |

(52) U.S. Cl.
CPC ..... *G06Q 30/0185* (2013.01); *G06F 16/9024* (2019.01); *G06N 20/00* (2019.01); *G06Q 40/02* (2013.01)

(58) Field of Classification Search
USPC .......................................................... 705/35
See application file for complete search history.

(56) References Cited

U.S. PATENT DOCUMENTS

| | | | |
|---|---|---|---|
| 8,805,737 B1* | 8/2014 | Chen ...................... | G06Q 40/00 235/380 |
| 10,268,660 B1* | 4/2019 | Arazi ...................... | G06F 17/18 |
| 10,459,827 B1* | 10/2019 | Aghdaie ................ | G06N 20/00 |
| 10,460,320 B1* | 10/2019 | Cao ......................... | G06N 20/10 |
| 10,778,706 B1* | 9/2020 | Lee ....................... | H04L 63/1416 |

(Continued)

OTHER PUBLICATIONS

"Credit card Fraud Detection using Machine Learning" (Year: 2020).*

(Continued)

*Primary Examiner* — Bruce I Ebersman
(74) *Attorney, Agent, or Firm* — Paradice & Li LLP

(57) ABSTRACT

This disclosure provides systems, methods and apparatuses for identifying fraudulent accounts associated with an electronic payment service. In some implementations, a computing device may retrieve a data set including a number of attributes for each of a multitude of accounts, and may construct a plurality of different graphs each based on a unique set of the attributes. Each graph may include a plurality of nodes linked together by a multitude of edges, where each node identifies a corresponding account and each edge indicates one or more of the corresponding attributes that are common to a pair of accounts. The computing device may determine a likelihood of each graph correctly identifying fraudulent accounts by analyzing groups of nodes connected to each other by corresponding groups of edges using historical account data, and may select the graph having the greatest determined likelihood to predict whether any of the accounts is fraudulent.

18 Claims, 9 Drawing Sheets

(56) References Cited

U.S. PATENT DOCUMENTS

| | | | |
|---|---|---|---|
| 2010/0169137 A1* | 7/2010 | Jastrebski | G06Q 20/04 705/30 |
| 2010/0191661 A1* | 7/2010 | Pritchett | G06Q 30/0185 709/217 |
| 2014/0279306 A1* | 9/2014 | Shi | G06Q 40/12 705/30 |
| 2016/0364794 A1* | 12/2016 | Chari | G06Q 40/02 |
| 2017/0169174 A1* | 6/2017 | Yeung | G16H 50/70 |
| 2018/0254101 A1* | 9/2018 | Gilmore | G16H 40/20 |
| 2020/0042857 A1* | 2/2020 | Fang | G06N 3/08 |
| 2020/0349573 A1* | 11/2020 | Dong | G06N 5/022 |
| 2020/0349586 A1* | 11/2020 | Deng | G06N 5/04 |
| 2021/0012346 A1* | 1/2021 | Walters | G06F 16/9024 |
| 2021/0142333 A1* | 5/2021 | Harris | G06Q 90/00 |
| 2021/0174367 A1* | 6/2021 | Harris | H04L 41/12 |

OTHER PUBLICATIONS

"Solve Fraud detection problem by using Graph based learning methods" (Year: 2019).*
"Airports watch the money" (Year: 2010).*
"A deep neural network algorithm for detecting credit card fraud" (Year: 2020).*

* cited by examiner

700

Removing one or more attributes from the first set of attributes to form the second set of attributes. (702)

Constructing a second graph including a plurality of nodes linked together by a multitude of edges each indicating one or more of the second set of attributes common to a corresponding pair of accounts. (704)

Replacing one or more attributes of the first set of attributes with one or more other attributes to form the second set of attributes. (712)

Constructing a second graph including a plurality of nodes linked together by a multitude of edges each indicating one or more of the second set of attributes common to a corresponding pair of accounts. (714)

Training the model of historical account data based on the components. (722)

↓

Determining whether one or more features of the components provide an accurate prediction of fraudulent accounts. (724)

Determining a combination of attributes having the greatest predictive accuracy based at least in part on the selecting. (732)

Performing component analysis on each of the edges in the first graph to form groups of interconnected nodes, wherein the nodes within each of the groups are not connected to nodes in other groups. (734)

Selectively updating the model of historical account data with one or both of the first graph and the second graph based at least in part on the first signal and the second signal, respectively. (736)

FIG. 7D

IDENTITY RESOLUTION FOR FRAUD RING DETECTION

CROSS-REFERENCE TO RELATED APPLICATIONS

This Patent Application claims priority to U.S. Provisional Patent Application No. 62/876,584 entitled "IDENTITY RESOLUTION FOR FRAUD RING DETECTION" filed on Jul. 19, 2019, which is assigned to the assignee hereof. The disclosures of all prior Applications are considered part of and are incorporated by reference in this Patent Application.

TECHNICAL FIELD

This disclosure relates generally to integrated circuits, and specifically to identifying monitoring one or more operating conditions of an integrated circuit.

DESCRIPTION OF RELATED ART

The problem of online financial fraud is one that has challenged businesses providing online accounting and payment services since the Internet provided a new and more efficient means to track expenses and provide various payment services. One of the challenges in combating online financial fraud is that persons committing financial fraud (the "fraudsters") tend to become more sophisticated with every new technological innovation designed to stop or deter them. As such, companies that provide online financial services are continually improving their fraud detection systems to combat increasingly sophisticated fraudsters.

One of the most common schemes employed to defraud an online payment service is to create multiple accounts (some of which may be legitimate) with the online payment service, and then use some or all of the multiple accounts to defraud the online payment service, for example, by improperly initiating payments from legitimate accounts to one or more of the fraudulent accounts, and then transferring the improper payments to an external account. Once such payments are transferred out of the online payment service, it may become more difficult to identify and trace these improper payments. Although online payment services have developed various tools to combat financial fraud, these tools may not identify all of the fraudulent accounts associated with the online payment service (or at least not before these fraudulent schemes succeed in misappropriating funds from other legitimate accounts).

Accordingly, there is a need for online payment services to identify fraudulent accounts as early as possible, and also to identify groups of fraudulent accounts involved in a fraud ring.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods and devices of this disclosure each have several innovative aspects, no single one of which is solely responsible for the desirable attributes disclosed herein.

One innovative aspect of the subject matter described in this disclosure can be implemented as a method for identifying fraudulent accounts associated with an electronic payment service. In some implementations, the method can be performed by one or more processors of a computing device, and can include retrieving a data set for each of a plurality of accounts from a database, each data set including a plurality of attributes of the corresponding account; selecting a first set of attributes from the plurality of attributes; constructing a first graph including a plurality of nodes linked together by a multitude of edges, wherein each of the nodes identifies a corresponding one of the accounts, and each of the edges indicates one or more of the first set of attributes common to a corresponding pair of accounts; forming a plurality of components in the first graph, each of the components including a group of nodes connected to each other by a corresponding group of edges; analyzing the components of the first graph using historical account data to generate a first signal indicating a likelihood of the first graph to identify fraudulent accounts; comparing the first signal with a second signal indicating the likelihood of a second graph to identify fraudulent accounts, wherein the second graph is based on a second set of attributes different than the first set of attributes; and selecting one of the first graph or the second graph, based on the comparing, to predict whether any of the plurality of accounts is fraudulent. In some implementations, the plurality of attributes may include one or more of a phone number, an email address, a mailing address, a bank account number, an IP address, a social security number (SSN), a tax ID, or an age of the account.

The first signal may indicate an accuracy with which the first graph identifies fraudulent accounts, and the second signal may indicate an accuracy with which the second graph identifies fraudulent accounts. The first signal may also indicate a percentage of the accounts covered by the first graph, and the second signal may also indicate a percentage of the accounts covered by the second graph. In some aspects, comparing the first signal with the second signal may include generating a first predictive model based on the first graph, generating a second predictive model based on the second graph, and comparing the first predictive model with the second predictive model.

In some implementations, the second graph may be derived by removing one or more attributes from the first set of attributes to form the second set of attributes, and then constructing the second graph to include a plurality of nodes linked together by a multitude of edges each indicating one or more of the second set of attributes common to a corresponding pair of accounts. In other implementations, the second graph may be derived by replacing one or more attributes of the first set of attributes with one or more other attributes to form the second set of attributes, and then constructing the second graph to include a plurality of nodes linked together by a multitude of edges each indicating one or more of the second set of attributes common to a corresponding pair of accounts.

The method may also include one or more of selectively updating the model of historical account data with one or both of the first graph and the second graph based at least in part on the respective first and second signals, determining a combination of attributes having the greatest predictive accuracy based at least in part on the selecting, and comparing the first graph with the second graph to generate a modelling difference, wherein selecting the one of the first graph or the second graph is further based on the modelling difference.

Another innovative aspect of the subject matter described in this disclosure can be implemented in a system. The system can include at least one or more processors and a memory. The memory may store instructions that, when executed by the one or more processors, causes the system to perform a number of operations. In some implementations, the number of operations may include retrieving a data set for each of a plurality of accounts from a database, each data set including a plurality of attributes of the corresponding account; selecting a first set of attributes from the plurality of attributes; constructing a first graph including a plurality of nodes linked together by a multitude of edges, wherein each of the nodes identifies a corresponding one of the accounts, and each of the edges indicates one or more of the first set of attributes common to a corresponding pair of accounts; forming a plurality of components in the first graph, each of the components including a group of nodes connected to each other by a corresponding group of edges; analyzing the components of the first graph using historical account data to generate a first signal indicating a likelihood of the first graph to identify fraudulent accounts; comparing the first signal with a second signal indicating the likelihood of a second graph to identify fraudulent accounts, wherein the second graph is based on a second set of attributes different than the first set of attributes; and selecting one of the first graph or the second graph, based on the comparing, to predict whether any of the plurality of accounts is fraudulent. In some implementations, the plurality of attributes may include one or more of a phone number, an email address, a mailing address, a bank account number, an IP address, a social security number (SSN), a tax ID, or an age of the account.

The first signal may indicate an accuracy with which the first graph identifies fraudulent accounts, and the second signal may indicate an accuracy with which the second graph identifies fraudulent accounts. The first signal may also indicate a percentage of the accounts covered by the first graph, and the second signal may also indicate a percentage of the accounts covered by the second graph. In some aspects, comparing the first signal with the second signal may include generating a first predictive model based on the first graph, generating a second predictive model based on the second graph, and comparing the first predictive model with the second predictive model.

In some implementations, the second graph may be derived by removing one or more attributes from the first set of attributes to form the second set of attributes, and then constructing the second graph to include a plurality of nodes linked together by a multitude of edges each indicating one or more of the second set of attributes common to a corresponding pair of accounts. In other implementations, the second graph may be derived by replacing one or more attributes of the first set of attributes with one or more other attributes to form the second set of attributes, and then constructing the second graph to include a plurality of nodes linked together by a multitude of edges each indicating one or more of the second set of attributes common to a corresponding pair of accounts.

Execution of the instructions may also cause the system to perform other operations including one or more of selectively updating the historical account data with one or both of the first graph and the second graph based at least in part on the respective first and second signals, determining a combination of attributes having the greatest predictive accuracy based at least in part on the selecting, and comparing the first graph with the second graph to generate modelling difference, wherein selecting the one of the first graph or the second graph is further based on the modelling difference.

Another innovative aspect of the subject matter described in this disclosure can be implemented in a non-transitory computer-readable medium. The non-transitory computer-readable medium may store instructions that, when executed by one or more processors of an apparatus, cause the apparatus to identify fraudulent accounts associated with an electronic payment service by performing a number of operations. In some implementations, the number of operations may include retrieving a data set for each of a plurality of accounts from a database, each data set including a plurality of attributes of the corresponding account; selecting a first set of attributes from the plurality of attributes; constructing a first graph including a plurality of nodes linked together by a multitude of edges, wherein each of the nodes identifies a corresponding one of the accounts, and each of the edges indicates one or more of the first set of attributes common to a corresponding pair of accounts; forming a plurality of components in the first graph, each of the components including a group of nodes connected to each other by a corresponding group of edges; analyzing the components of the first graph using historical account data to generate a first signal indicating a likelihood of the first graph to identify fraudulent accounts; comparing the first signal with a second signal indicating the likelihood of a second graph to identify fraudulent accounts, wherein the second graph is based on a second set of attributes different than the first set of attributes; and selecting one of the first graph or the second graph, based on the comparing, to predict whether any of the plurality of accounts is fraudulent. In some implementations, the plurality of attributes may include one or more of a phone number, an email address, a mailing address, a bank account number, an IP address, a social security number (SSN), a tax ID, or an age of the account.

The first signal may indicate an accuracy with which the first graph identifies fraudulent accounts, and the second signal may indicate an accuracy with which the second graph identifies fraudulent accounts. The first signal may also indicate a percentage of the accounts covered by the first graph, and the second signal may also indicate a percentage of the accounts covered by the second graph. In some aspects, comparing the first signal with the second signal may include generating a first predictive model based on the first graph, generating a second predictive model based on the second graph, and comparing the first predictive model with the second predictive model.

In some implementations, the second graph may be derived by removing one or more attributes from the first set of attributes to form the second set of attributes, and then constructing the second graph to include a plurality of nodes linked together by a multitude of edges each indicating one or more of the second set of attributes common to a corresponding pair of accounts. In other implementations, the second graph may be derived by replacing one or more attributes of the first set of attributes with one or more other attributes to form the second set of attributes, and then constructing the second graph to include a plurality of nodes linked together by a multitude of edges each indicating one or more of the second set of attributes common to a corresponding pair of accounts.

The non-transitory computer-readable medium may also store instructions that, when executed by the one or more processors, cause the apparatus to perform other operations including one or more of selectively updating the historical account data with one or both of the first graph and the second graph based at least in part on the respective first and second signals, determining a combination of attributes having the greatest predictive accuracy based at least in part on the selecting, and comparing the first graph with the second graph to generate modelling difference, wherein selecting the one of the first graph or the second graph is further based on the modelling difference.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

The example implementations are illustrated by way of example and are not intended to be limited by the figures of the accompanying drawings. Like numbers reference like elements throughout the drawings and specification.

FIG. 7A shows an illustrative flow chart depicting an example operation for deriving a first graph, according to some implementations.

FIG. 7B shows an illustrative flow chart depicting an example operation for deriving a second graph, according to some implementations.

FIG. 7C shows an illustrative flow chart depicting an example operation for analyzing the components of a graph, according to some implementations.

FIG. 7D shows an illustrative chart depicting additional operations for identifying fraudulent accounts, according to some implementations.

DETAILED DESCRIPTION

Figure 1:
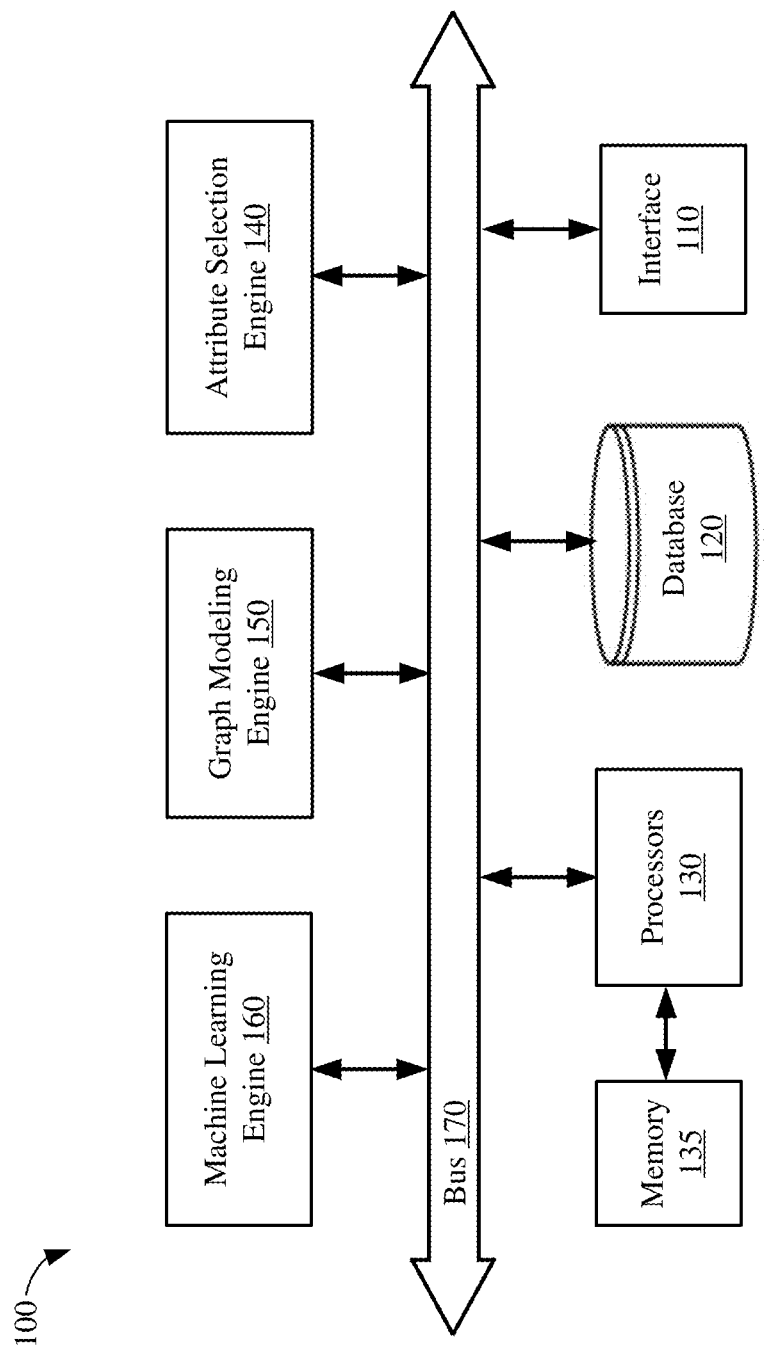
FIG. 1 shows an example fraud detection system, according to some implementations.

Implementations of the subject matter described in this disclosure may be used to identify fraudulent accounts associated with an online payment service. As discussed above, many fraudsters open multiple accounts to improperly exploit money movement products associated with the online payment service. Aspects of the present disclosure use links (such as common attributes) between accounts to identify accounts that may be fraudulent and/or that are a part of a fraud ring. The connected components of a number of different network graphs representing connections between groups of accounts are used to identify fraud ring candidates, and a grid of possible configurations of the network graph may be constructed and analyzed to identify the best configuration or schema of the network graph. In some implementations, each of the different network graphs may be compared with historical account data (and/or with each other) to determine an accuracy score indicative of the network graph's ability to predict or identify which accounts may be fraudulent, and the accuracy scores may be used to select the particular network graph configuration or schema that can identify fraudulent accounts with the greatest accuracy. In addition, or in the alternative, each of the different network graphs may be compared with historical account data to determine a coverage score indicative of the number or percentage of accounts considered by the network graph, and the coverage scores may be used in conjunction with the accuracy scores to select the particular network graph configuration or schema that can identify fraudulent accounts with the greatest accuracy based on a selected minimum coverage amount (such as a minimum number or percentage of the accounts associated with the payment service).

Various implementations of the subject matter disclosed herein provide one or more technical solutions to the technical problem of identifying fraudulent accounts associated with electronic or online payment services by applying machine learning engines to one or more models or graphs to predict whether certain accounts represented by nodes in the graphs are fraudulent. More specifically, various aspects of the present disclosure provide a unique computing solution to a unique computing problem that did not exist prior to online payment services that can facilitate electronic transfers of funds between various accounts registered with the online payment service and/or external bank accounts. As such, implementations of the subject matter disclosed herein are not an abstract idea such as organizing human activity or a mental process that can be performed in the human mind.

Moreover, various aspects of the present disclosure effect an improvement in the technical field of identifying fraudulent accounts associated with an electronic or online payment service by constructing specific types of network graphs indicative of a multitude of different types of links, connections, or attributes common to or shared by a plurality of different groups of the accounts in a specific technological way, and compares a number of different components of each of the network graphs with historical account data to determine a likelihood of each network graph identifying the fraudulent accounts. The construction of these specific types of network graphs, as well as their comparison with historical account data to determine the likelihoods, cannot be performed in the human mind, much less using pen and paper. In addition, implementations of the subject matter disclosed herein do far more than merely create contractual relationships, hedge risks, mitigate settlement risks, and the like, and therefore cannot be considered a fundamental economic practice.

FIG. 1 shows a fraud detection system 100, according to some implementations. Although described herein with respect to detecting or identifying fraudulent accounts associated with an online payment service, various aspects of the fraud detection system 100 disclosed herein may be applicable for detecting or identifying items or members of other applications for any suitable characteristic, parameter, or quality. For example, constructing different network graphs of a data set based on different sets or combinations of attributes and then determining which of the network graph provides the highest predictive accuracy rate may be used in a variety of applications including (but not limited to) malware detection, string searching, component failure analysis, and so on.

The fraud detection system 100 is shown to include an input/output (I/O) interface 110, a database 120, one or more data processors 130, a memory 135 coupled to the data processors 130, an attribute selection engine 140, a graph modeling engine 150, and a machine learning engine 160. In some implementations, the various components of the fraud detection system 100 may be interconnected by at least a data bus 170, as depicted in the example of FIG. 1. In other implementations, the various components of the fraud detection system 100 may be interconnected using other suitable signal routing resources.

The interface 110 may include a screen, an input device, and other suitable elements that allow a user to provide information to the fraud detection system 100 and/or to retrieve information from the fraud detection system 100. Example information that can be provided to the fraud detection system 100 may include a set of attributes, one or more weighting factors for a number of the attributes, a number of network graphs to be created and analyze to determine which configuration provides a desired balance between accuracy and coverage, and the like. Example information that can be retrieved from the fraud detection system 100 may include account information, configurations of network graphs, accuracy rates and account coverage for various combinations of attributes, predictions of fraudulent accounts, accounts linked to or otherwise associated with fraudulent accounts, and the like.

The database 120 may store any suitable information pertaining to each of a plurality of accounts registered with the online payment service, and may also store historical account data. For example, the data set for each account may include account information (such as an age of the account, balances, transaction histories, fraud investigations, and so on), owner information (such as phone numbers, email addresses, physical mailing address, SSNs, and a tax ID), and related information (such as bank names, bank account numbers, and IP addresses of user log-ins). The historical account data may indicate which types of network graphs and/or which combinations of attributes and features were used to identify accounts subsequently determined to be fraudulent. In some implementations, the database 120 may be a relational database capable of presenting the data sets to a user in tabular form and capable of manipulating the data sets using relational operators. In some aspects, the database 120 may use Structured Query Language (SQL) for querying and maintaining the database.

In some implementations, the database 120 may store a plurality of attributes for each account in tabular form, either collectively in an attribute table or individually within each of the data sets. The attributes may include (but not limited to) a phone number, an email address, a mailing address, a bank account number, an IP address, a social security number (SSN), a tax ID, or an age of the account. In some other implementations, the database 120 may store one or more additional attributes and/or a number of features for each account.

The data processors 130, which may be used for general data processing operations (such as manipulating the data sets stored in the database 120), may be one or more suitable processors capable of executing scripts or instructions of one or more software programs stored in the fraud detection system 100 (such as within the memory 135). The data processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory) may store any number of software programs, executable instructions, machine code, algorithms, and the like that can be executed by the data processors 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The attribute selection engine 140 may be used to select or define a set of attributes that define the links or edges between groups of accounts. In some implementations, the attribute selection engine 140 may apply weighting factors or priorities to one or more of the attributes associated with a given account. For example, if a first attribute (such as an IP address) shared by a candidate account and a fraudulent account is found to be a better indicator that the candidate account is fraudulent than a second attribute (such as a mailing address), then the first attribute may be assigned a greater weight than the second attribute.

The modeling engine 150 may be used to present the interrelationships and common attributes of the accounts in a visual form to the user. The modeling engine 150 may construct one or more network graphs indicating various links, connections, and commonalities of a plurality of accounts based on one or more unique sets of attributes. In some implementations, the modeling engine 150 may use the account data sets stored in the database 120 to construct a network graph that includes a plurality of nodes linked together by a multitude of edges, wherein each of the nodes identifies a corresponding one of the accounts, and each of the edges indicates one or more attributes common to a corresponding pair of accounts linked by the edge. Each network graph may include a number of disconnected subgraphs or "component" graphs that represent clusters of accounts linked together by common attributes. The component graphs may be analyzed to derive one or more signals indicative of accuracy rates and/or account coverage, and the signals derived from each of a plurality of different network graphs may be analyzed (such as compared) to determine which network graph (and thus which combination of attributes) provides a desired balance between accuracy and coverage.

The machine learning engine 160 may store any number of machine learning models that can be used to predict whether certain accounts represented by a network graph are fraudulent. A machine learning model can take the form of an extensible data structure that can be used to represent sets of words or phrases and/or can be used to represent sets of attributes or features. The machine learning models may be seeded with historical account data indicating the types of component structures and/or the types of attributes in previously generated network graphs found to have accurately predicted or identified one or more candidate accounts as fraudulent. In some implementations, the machine learning models may store an accuracy score for each of a plurality of different component structures and attributes. The accuracy scores may be continually updated based on determinations that certain candidate accounts were subsequently found to be fraudulent (or that certain candidate accounts were subsequently found to be benign accounts). In addition, or in the alternative, the machine learning models may analyze historical account data and/or real-time data to identify one or more features present in network graphs found to contain fraudulent accounts.

The seeded machine learning models may be used as predictors of whether accounts represented by a newly constructed network graph or component graph are likely to be fraudulent. For example, the machine learning engine 160 may compare each of the component graphs within a newly constructed network graph with historical account data to generate a signal (such as a score) indicative of the probability that the corresponding component graph can be used to accurately predict whether a certain account is fraudulent. In some aspects, the machine learning engine 160 may receive a plurality of different network graphs constructed by the graph modeling engine 150, and may determine a score for each of the different network graphs. In this manner, the particular structures of the component graphs associated with a number of different network graphs, as well as the presence (or absence) of certain attributes therein, can be used to predict whether candidate accounts represented by the network graphs are likely to be fraudulent.

In some implementations, the comparisons performed by the machine learning engine 160 may be quantified, for example, based on a degree of similarity or correlation between historical account data and the network graphs constructed by the graph modeling engine 150. This may allow the machine learning engine 160 to rank or assign priorities to a number of different network graphs constructed from the same data sets, for example, to determine which of a plurality of different combinations of attributes provides an optimum balance between accuracy and coverage.

The particular architecture of the fraud detection system 100 shown in FIG. 1 is but one example of a variety of different architectures within which aspects of the present disclosure may be implemented. For example, in other implementations, the fraud detection system 100 may not include an attributes selection engine 140, the functions of which may be implemented by the processors 130 executing corresponding instructions or scripts stored in the memory 135. In some other implementations, the functions of the graph modeling engine 150 may be performed by the processors 130 executing corresponding instructions or scripts stored in the memory 135. Similarly, the functions of the machine learning engine 160 may be performed by the processors 130 executing corresponding instructions or scripts stored in the memory 135.

Figure 2:
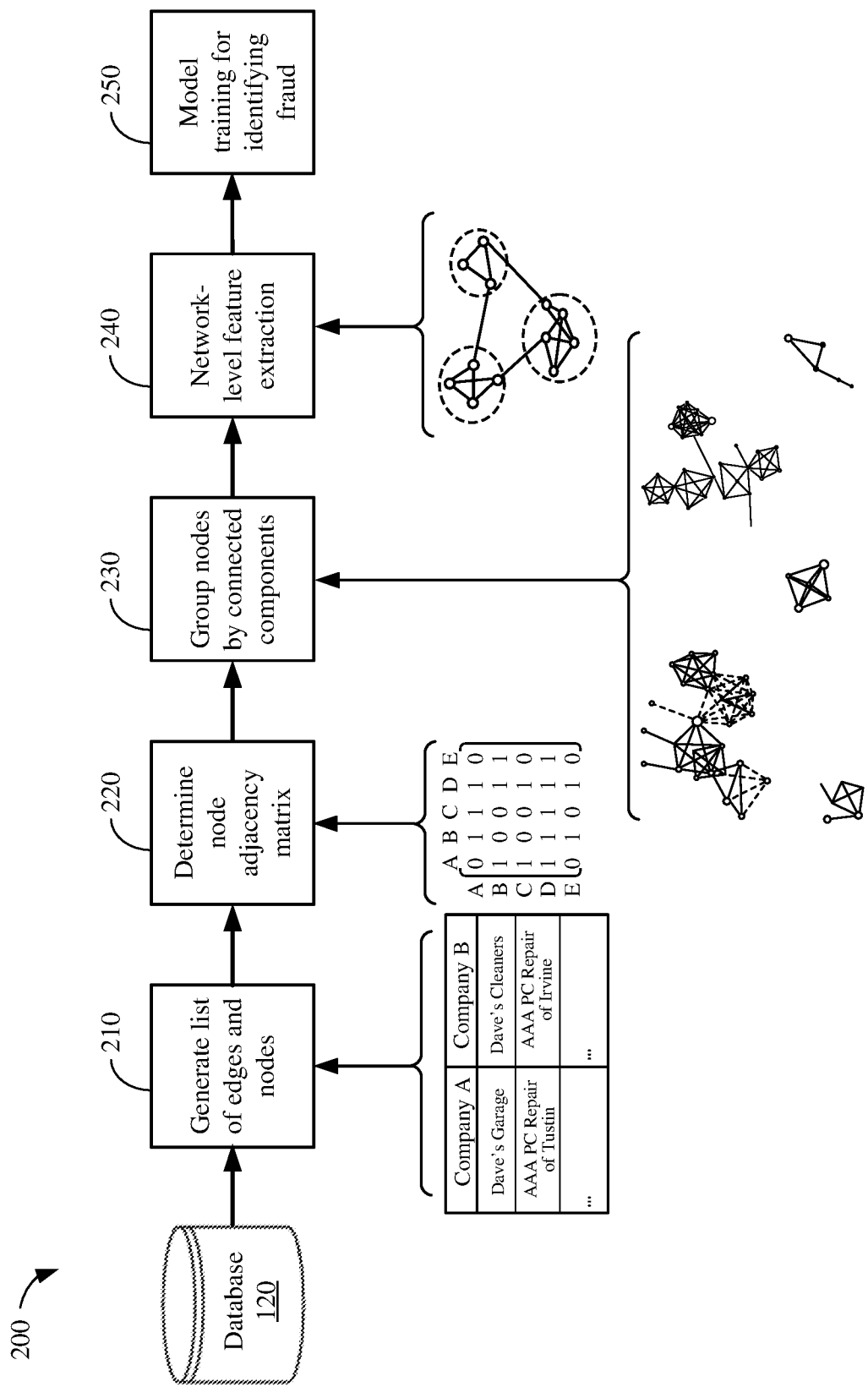
FIG. 2 shows an example process flow that may be employed by the fraud detection system of FIG. 1, according to some implementations.

FIG. 2 shows a high-level overview of an example process flow that may be employed by the fraud detection system of FIG. 1. In block 210, account data retrieved from the database 120 is used to generate a network graph including a plurality of nodes linked together by a multitude of edges. Each of the nodes identifies a corresponding one of the accounts, and each of the edges indicates one or more attributes common to the accounts linked by the corresponding edge. A table listing the edges and nodes of the network graph may be generated. At block 220, adjacent nodes in the table are identified and used to create a node adjacency matrix. At block 230, the nodes in the adjacency matrix are grouped by connected components, for example, to create a plurality of graph components. The graph components may be formed such that each node in a given graph component is connected only to other nodes in the same graph component. In this manner, the network graph may be divided into a plurality of disconnected graph components, each representing a cluster or "neighborhood" of accounts linked together by common attributes. At block 240, a network-level feature extraction operation is performed to extract characteristics or features from the graph components that may be useful in identifying fraudulent accounts. At block 250, the network graph is provided to one or more machine learning models to determine signals indicative of the coverage of the network graph and the accuracy with which the network graph can predict or identify fraudulent accounts. In some implementations, one or more signals may be generated for each of the graph components that form the network graph. This process may be repeated for each of a plurality of different network graphs constructed using different combinations of attributes, for example, to determine which of the different network graphs provides the most effective prediction of which accounts may be fraudulent.

Figure 3A:
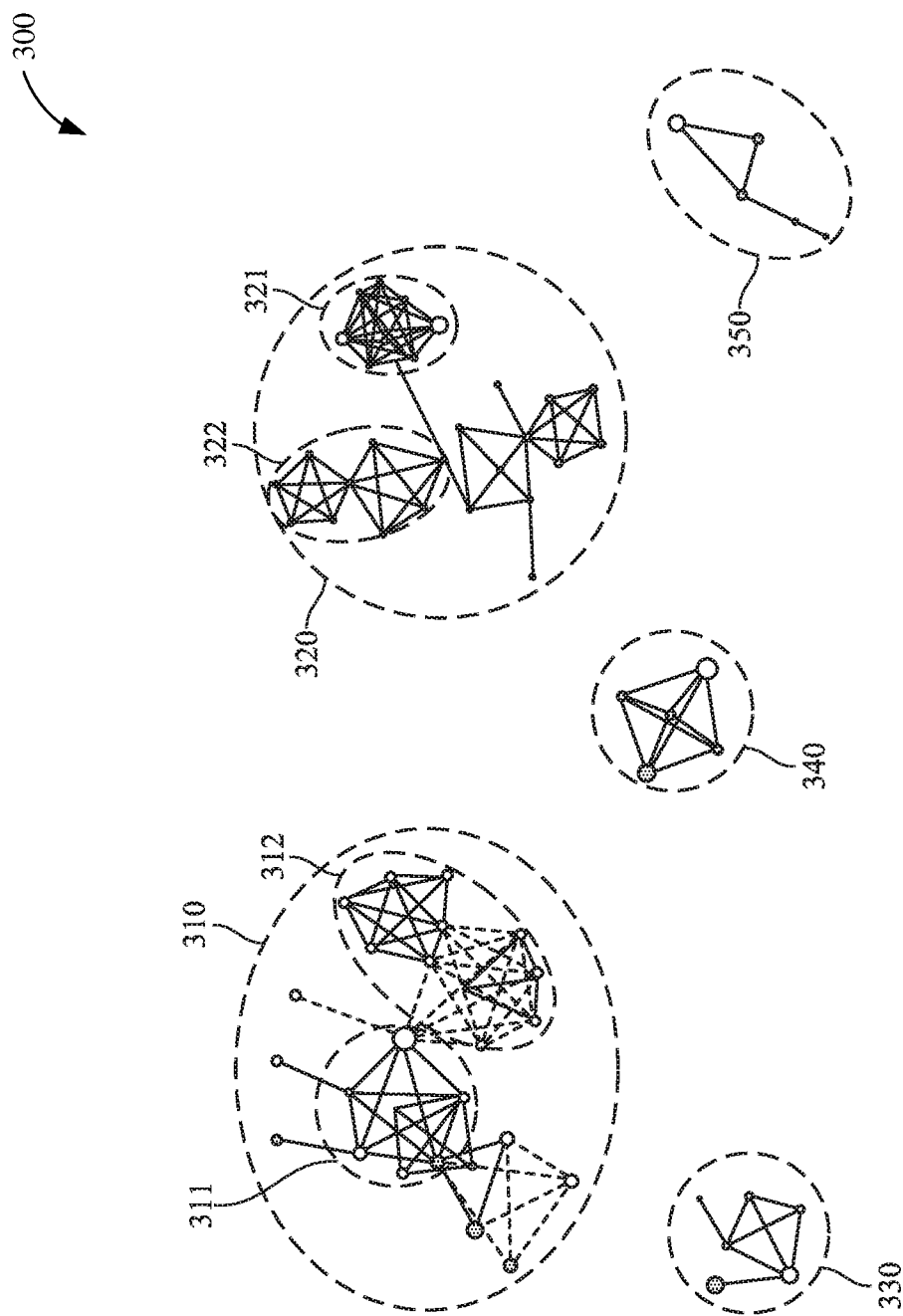
FIG. 3A shows an example network graph illustrating edge connections between nodes belonging to different graph components, according to some implementations.

FIG. 3A shows an example network graph 300 illustrating edge connections between nodes belonging to different graph components, according to some implementations. The network graph 300 is shown to include five different graph components 310, 320, 330, 340, and 350. The nodes within each of the graph components are connected only to other nodes in the same graph component. For example, the nodes within the first graph component 310 are connected only to other nodes within the first graph component 310, and are not connected to nodes within any of the other graph components 320, 330, 340, or 350. Similarly, the nodes within the second graph component 320 are connected only to other nodes within the second graph component 320, and are not connected to nodes within any of the other graph components 310, 330, 340, or 350.

The first graph component 310 includes several clusters of nodes each representing a neighborhood of nodes having relatively strong connections to each other and having relatively weak connections to nodes belonging to other clusters in the first graph component 310. For example, nodes within a first cluster 311 of the first graph component 310 have relatively strong connections to each other, and have relatively weak connections to nodes in other clusters. Similarly, nodes within a second cluster 312 of the first graph component 310 have relatively strong connections to each other, and have relatively weak connections to nodes in other clusters in the first graph component 310. The second graph component 320 also includes several clusters of nodes such as a first cluster 321 and a second cluster 322. As used herein, a group of nodes may be deemed to have relatively strong connections to each other based on the number of individual connections between the nodes being greater than a threshold number and/or on the types of attributes common to the connected nodes (such as attributes found to have a predictive score greater than a threshold score). Conversely, a group of nodes may be deemed to have relatively weak connections to each other based on the number of individual connections between the nodes being less than (or equal to) the threshold number and/or on the types of attributes common to the connected nodes (such as attributes found to have a predictive score less than or equal to the threshold score).

Figure 3B:
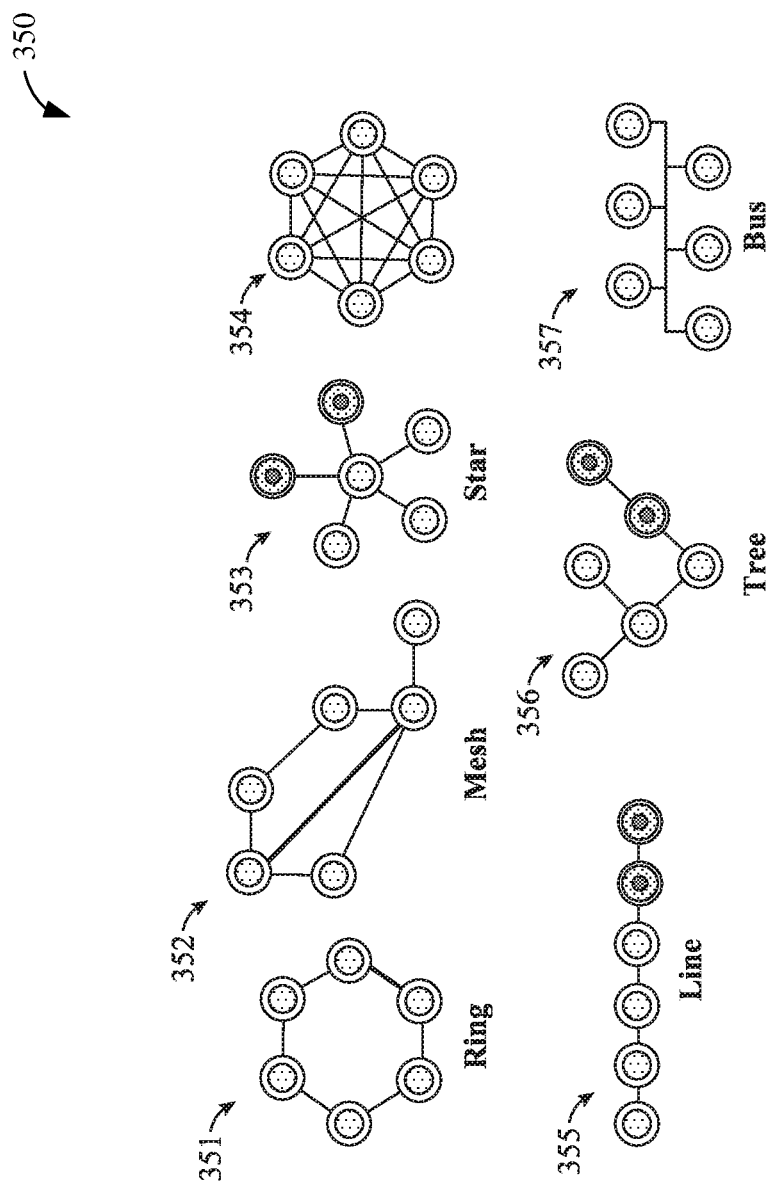
FIG. 3B shows several example types of network graphs that may be generated by the fraud detection system of FIG. 1, according to some implementations.

FIG. 3B shows several example types of network graphs that may be generated by the fraud detection system of FIG. 1, according to some implementations. More specifically, FIG. 3B shows a first graph 351 having a ring architecture, a second graph 352 having a mesh architecture, a third graph 351 having a star architecture, a fourth graph 354 having a fully connected architecture, a fifth graph 355 having a line architecture, a sixth graph 356 having a tree architecture, and a seventh graph 357 having a bus architecture. In some implementations, the type of architecture of a given graph created by the fraud detection system of FIG. 1 may be indicative of the accuracy with which the given graph can predict a presence of fraudulent accounts. For example, an account connected to one or more "bad" accounts via a fully connected graph 354 may be more likely to be fraudulent than an account connected to a "bad" account via a line graph 355, for example, due to a greater number and concentration of links between neighboring accounts.

Figure 4A:
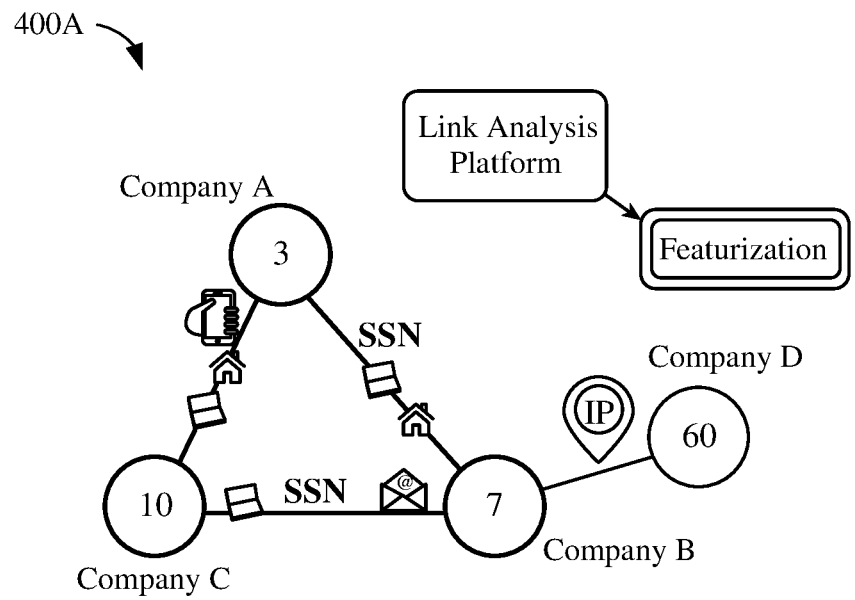
FIGS. 4A-4B show example graph components that may be generated by the fraud detection system of FIG. 1, according to some implementations.

FIG. 4A shows an example graph component 400A that includes four nodes connected together by edges or links. The four nodes may correspond to or otherwise represent four different accounts corresponding to companies A-D, respectively. More specifically, companies B and A are by a common SSN, a common device, and a common mailing address; companies B and C are linked by a common SSN, a common device, and a common email address; companies B and D are linked by a common IP address; companies A and C are linked by a common phone number, a common mailing address, and a common device. As described above, the types of attributes common to the nodes in graph component 400A may be indicative of the predictive ability to identify fraudulent accounts. In some implementations, the structure of graph component 400A may also be indicative of the predictive ability to identify fraudulent accounts.

Figure 4B:
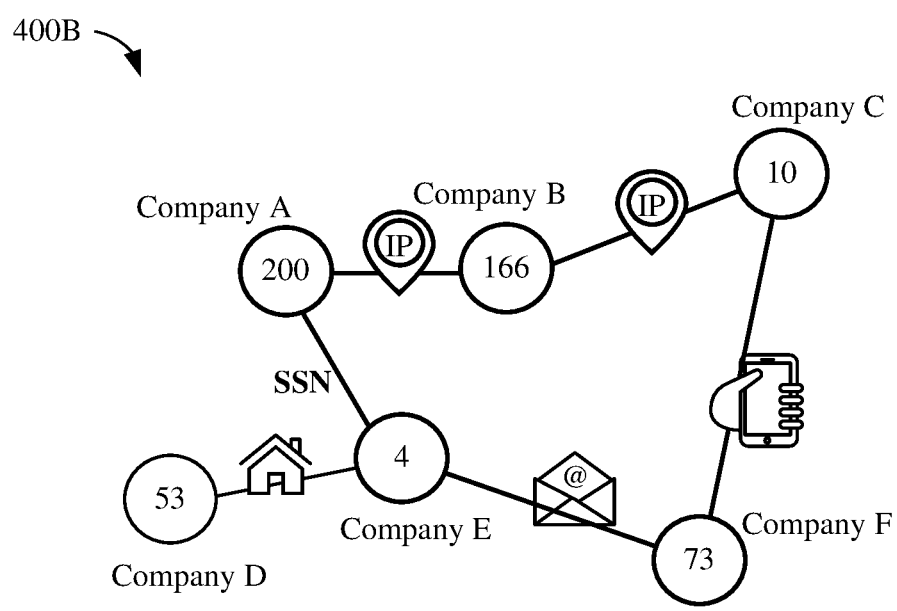

FIG. 4B shows another example graph component 400B that includes six nodes connected together by edges or links. The six nodes may correspond to or otherwise represent six different accounts corresponding to companies A-F, respectively. More specifically, company B is linked to both company A and company C by a common IP address; company E is linked to company A by a common SSN, is linked to company D by a common mailing address, and is linked to company F by a common email address; company F is linked to company E by a common email address, and is linked to company C by a common phone number. As described above, the types of attributes common to the nodes in graph component 400B may be indicative of the predictive ability to identify fraudulent accounts. In some implementations, the structure of graph component 400B may also be indicative of the predictive ability to identify fraudulent accounts. In addition, differences between the structures of graph components 400A and 400B, as well as differences in attributes that connect the nodes within each of the graph components 400A and 400B, may be indicative of which of the graph components 400A and 400B is more likely to identify fraudulent accounts.

Figure 5A:
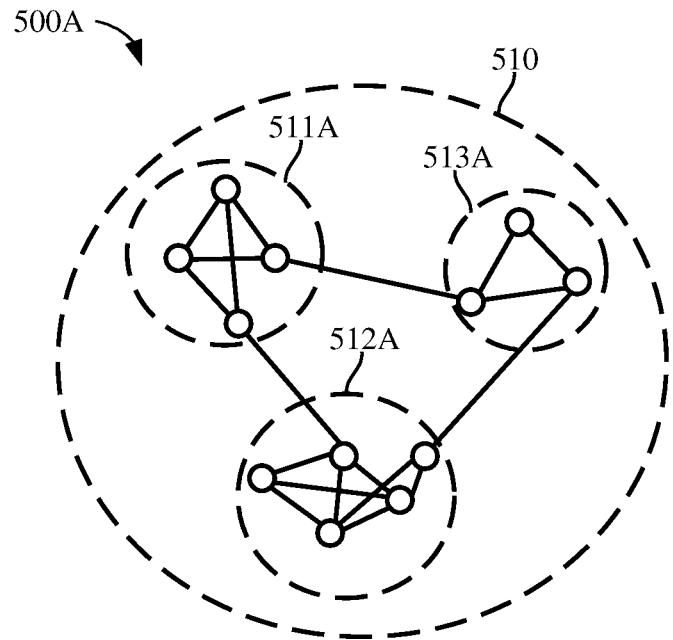
FIG. 5A shows an example network graph including three graph components connected to each other by a single edge.
Figure 5B:
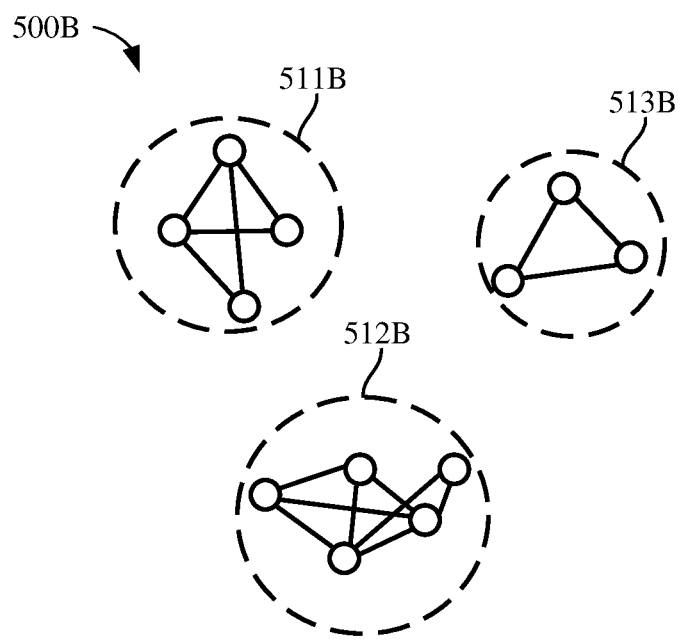
FIG. 5B shows the three graph components of FIG. 5A after removal of the single edges, according to some implementations.

FIG. 5A shows an example network graph 510 including three graph components 511A-513A connected to each other by a single edge. The first and second graph components 511A-512A are fully connected graph types, and the third graph component 513A is a ring graph type. The nodes within each of the first and second graph components 511A-512A are connected to each other by multiple links, while each of the three graph components 511A-513A are connected to each other by a single link. As such, the links between the three graph components 511A-513A may be removed to form three separate graphs 511B-513B, as depicted by the illustration 500B of FIG. 5B.

Figure 6:
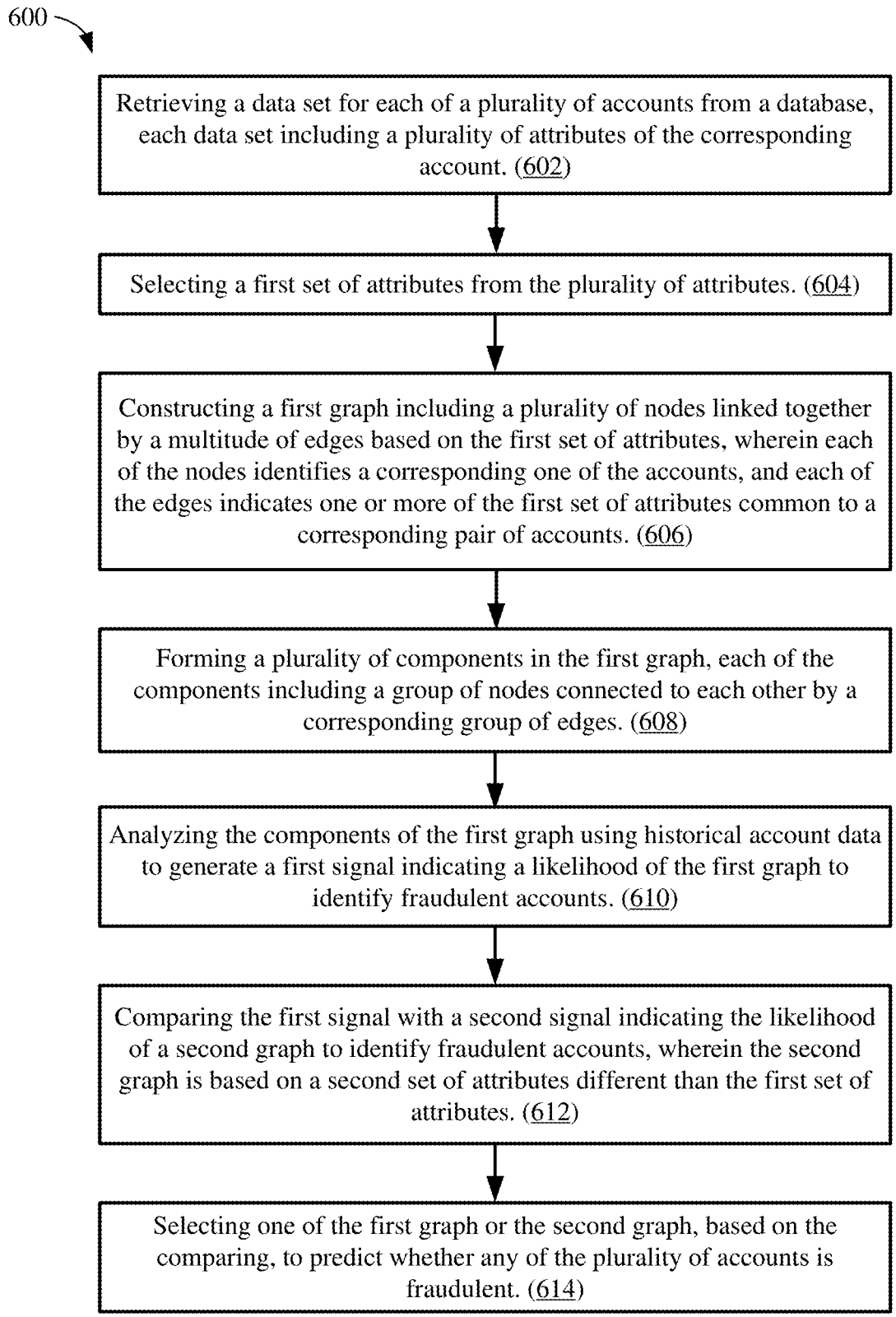
FIG. 6 shows an illustrative flow chart depicting an example operation for identifying fraudulent accounts associated with an online payment service, according to some implementations.

FIG. 6 shows an illustrative flow chart depicting an example operation for identifying fraudulent accounts associated with an online payment service, according to some implementations. The example operation 600 is described below with respect to the fraud detection system 100 of FIG. 1 for illustrative purposes only. It is to be understood that the example operation 600 may be performed by other suitable systems, computers, or servers.

The operation 600 may begin at block 602 by retrieving a data set for each of a plurality of accounts from a database, each data set including a plurality of attributes of the corresponding account. The operation 600 proceeds at block 604 with selecting a first set of attributes from the plurality of attributes. The operation 600 proceeds at block 606 with constructing a first graph including a plurality of nodes linked together by a multitude of edges based on the first set of attributes, wherein each of the nodes identifies a corresponding one of the accounts, and each of the edges indicates one or more of the first set of attributes common to a corresponding pair of accounts. The operation 600 proceeds at block 608 with forming a plurality of components in the first graph, each of the components including a group of nodes connected to each other by a corresponding group of edges. The operation 600 proceeds at block 610 with analyzing the components of the first graph using historical account data to generate a first signal indicating a likelihood of the first graph to identify fraudulent accounts. The operation 600 proceeds at block 612 with comparing the first signal with a second signal indicating the likelihood of a second graph to identify fraudulent accounts, wherein the second graph is based on a second set of attributes different than the first set of attributes. The operation 600 proceeds at block 614 with selecting one of the first graph or the second graph, based on the comparing, to predict whether any of the plurality of accounts is fraudulent.

In some implementations, retrieving the data sets in block 602 may include filtering the data sets, for example, to remove account information that is not useful for identifying fraudulent accounts associated with the online payment service. The removal of such account information may reduce the size and complexity of source data from which a plurality of network graphs can be created, which in turn may reduce processing time and processing resources. The attributes may be or include any suitable parameters, characteristics, identifiers, or other information that can be used to predict whether one or more of the accounts is a candidate for a fraudulent account. In some aspects, the attributes may include (but not limited to) a phone number, an email address, a mailing address, a bank account number, an IP address, a social security number (SSN), a tax ID, or an age of the account.

In some implementations, the first set of attributes may be selected in block 604 to include attributes or features most likely to predict whether a given account is a fraudulent account.

In some implementations, the first graph in block 606 indicates which of the first set of attributes are common to each of the accounts, which may be used to determine how likely the links between a candidate account and a bad account can indicate that the candidate account is fraudulent. For example, if the candidate account and the bad account are linked together by only a common mailing address, then the first graph may be determined to not accurately predict whether the candidate account is fraudulent. Conversely, if the candidate account and the bad account are linked together by a SSN, a common device, and a common IP address (which may indicate that both the candidate account and the bad account were created by the same person), then the first graph may be determined to accurately predict whether the candidate account is fraudulent.

In some implementations, each of the components in block 608 may include a unique group of nodes connected to each other by one or more edges (e.g., attributes) but not connected to any other nodes in the first graph, for example, such that each of nodes belonging to a given component shares at least one attribute with another node belonging to the given component. In this manner, each account represented in a given component shares at least one attribute (e.g., a phone number or SSN) with another account represented in the given component. In some aspects, each of the graph components may be referred to as a neighborhood from which one or more features can be extracted and used as an indicator of a fraudulent account. For example, if a particular node belongs to a graph component in which 60% of the member nodes were previously determined to be fraudulent, the percentage value 60% may be compared with historical account data to generate a probability that the particular account is fraudulent.

In some implementations, analyzing the components of the first graph in block 610 may include determining a similarity between the component graphs of the first graph and component graphs of one or more reference graphs that have been determined to contain fraudulent accounts. For example, if the structure or pattern of edges that connect nodes belonging to a given graph component have a high degree of correlation (such as greater than a correlation threshold) with the structure or pattern of edges that connect nodes belonging to historical graph components associated with fraudulent accounts, then the given graph component may be assigned a relatively high accuracy rate for identifying fraudulent accounts. Conversely, if there is a high degree of correlation between the component structures of the first graph and historical graph components associated with an absence of fraudulent accounts, then the given graph component may be assigned a relatively low accuracy rate for identifying fraudulent accounts (since none were found).

In some implementations, the comparing in block 612 may be used to determine the relative accuracy with which each of a plurality of different graphs can predict or identify fraudulent accounts, for example, to determine which of a plurality of component structures provides the best indicator of a fraudulent account. In some aspects, the comparing may also determine an account coverage score for each of the different graph components, for example, to determine an optimal balance between accuracy rate and account coverage. Any number of different graphs may be constructed from the same account data sets (such as by selecting different combinations of attributes) and then compared with each other to determine which of the different graphs (and thus which combination of attributes) provides a desired balance between accuracy and coverage. Thus, although the example described above with respect to FIG. 6 constructs first and second graphs, various implementations of the subject matter disclosed herein may construct or generate any suitable number of different graphs to determine which set or combination of attributes may provide the most accurate indication of fraudulent accounts.

In some implementations, selecting one of the first graph or the second graph in block 614 may include comparing one or more accuracy and/or coverage metrics determined for each of the first and second graphs to determine which of the first graph or the second graph provides a desired balanced between the number of accounts covered by each graph and the accuracy with which each graph can predict or identify fraudulent accounts.

FIG. 7A shows an illustrative flow chart depicting an example operation 700 for deriving a first graph, according to some implementations. The example operation 700 may be performed by any suitable computing device or system (such as the fraud detection system 100 of FIG. 1). The operation 700 may begin at block 702 by removing one or more attributes from the first set of attributes to form the second set of attributes. The operation 700 proceeds at block 704 with constructing a second graph including a plurality of nodes linked together by a multitude of edges each indicating one or more of the second set of attributes common to a corresponding pair of accounts.

FIG. 7B shows an illustrative flow chart depicting an example operation 710 for deriving a second graph, according to some implementations. The example operation 710 may be performed by any suitable computing device or system (such as the fraud detection system 100 of FIG. 1). The operation 710 may begin at block 712 by replacing one or more attributes of the first set of attributes with one or more other attributes to form the second set of attributes. The operation 710 proceeds at block 714 with constructing a second graph including a plurality of nodes linked together by a multitude of edges each indicating one or more of the second set of attributes common to a corresponding pair of accounts.

FIG. 7C shows an illustrative flow chart depicting an example operation 720 for analyzing the components of a graph, according to some implementations. The example operation 720 may be performed by any suitable computing device or system (such as the fraud detection system 100 of FIG. 1). In some implementations, the operation 720 may be one implementation of the process of block 610 of FIG. 6. The operation 720 may begin at block 722 by training the model of historical account data based on the components. The operation 720 proceeds at block 724 with determining whether one or more features of the components provide an accurate prediction of fraudulent accounts.

FIG. 7D shows an illustrative chart depicting additional operations 730 for identifying fraudulent accounts, according to some implementations. The additional operations 730, which may be performed after selecting one of the first graph or the second graph in block 614 of the example operation 600 of FIG. 6, may include one or more of block 732, block 734, and block 736. In block 732, the operation may proceed with determining a combination of attributes having the greatest predictive accuracy based at least in part on the selecting. In block 734, the operation may proceed with performing component analysis on each of the edges in the first graph to form groups of interconnected nodes, wherein the nodes within each of the groups are not connected to nodes in other groups. In block 736, the operation may proceed with selectively updating the historical account data with one or both of the first graph and the second graph based at least in part on the first signal and the second signal, respectively.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above.

Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of identifying fraudulent accounts associated with an electronic payment service, the method performed by one or more processors of a computing device and comprising:
   retrieving, by an interface of the computing device, a data set for each corresponding account of a plurality of accounts from a database, each data set including a plurality of attributes of the corresponding account;
   selecting, by an attribute selection engine of the computing device, a first set of attributes from the plurality of attributes;
   constructing, by a graph modeling engine of the computing device, a first graph including a plurality of nodes linked together by a multitude of edges based on the first set of attributes, wherein each of the nodes identifies a one of the accounts, and each edge of the multitude of edges indicates one or more of the first set of attributes common to a corresponding pair of accounts;
   forming, by the computing device, a plurality of components in the first graph, each component of the plurality of components including a group of nodes connected to each other by a corresponding group of edges;
   providing, by the computing device, the plurality of components of the first graph to a machine learning engine of the computing device including one or more seeded machine learning models, wherein the one or more seeded machine learning models are seeded with historical account data indicating one or more of types of component structures or types of attributes in previously generated network graphs found to predict one or more historical accounts from a plurality of historical accounts as fraudulent;
   analyzing, by the one or more seeded machine learning models of the computing device, the plurality of components of the first graph to generate a first signal indicating a likelihood of the first graph to identify fraudulent accounts from the plurality of accounts, wherein the first signal indicates:
      an accuracy with which the first graph identifies the fraudulent accounts; and
      a first coverage of the plurality of accounts by the first graph;
   comparing, by the machine learning engine of the computing device, the first signal with a second signal indicating the likelihood of a second graph to identify the fraudulent accounts from the plurality of accounts, wherein the second graph is based on a second set of attributes different than the first set of attributes and wherein the second signal indicates:
      an accuracy with which the second graph identifies the fraudulent accounts; and
      a second coverage of the plurality of accounts by the second graph;
   selecting, by the computing device, one of the first graph or the second graph, based on the comparing, to predict whether any of the plurality of accounts is fraudulent; and
   outputting, by the interface of the computing device, one or more of:
      a configuration of the selected network graph;

an indication of an accuracy with which the selected network graph identifies the fraudulent accounts and a coverage of the plurality of accounts by the selected network graph;

a prediction of one or more candidate accounts from the plurality of accounts as fraudulent based on the selected network graph; or an indication of one or more accounts from the plurality of accounts and that are associated with the one or more candidate accounts.

2. The method of claim 1, wherein the one or more attributes includes one or more of a common phone number, a common email address, a common mailing address, a common bank account number, a common IP address, a common social security number (SSN), a common tax ID, or a common age of the account.

3. The method of claim 1, wherein the nodes within a respective one of the plurality of components of the first graph are not connected to any other nodes in the first graph.

4. The method of claim 1, wherein the comparing comprises:
generating a first predictive model based on the first graph;
generating a second predictive model based on the second graph; and
comparing the first predictive model with the second predictive model.

5. The method of claim 1, wherein the second graph is derived by:
removing one or more attributes from the first set of attributes to form the second set of attributes; and
constructing a second graph including a plurality of nodes linked together by a multitude of edges each indicating one or more of the second set of attributes common to a corresponding pair of accounts.

6. The method of claim 1, wherein the second graph is derived by:
replacing one or more attributes of the first set of attributes with one or more other attributes to form the second set of attributes; and
constructing a second graph including a plurality of nodes linked together by a multitude of edges each indicating one or more of the second set of attributes common to a corresponding pair of accounts.

7. The method of claim 1, further comprising:
selectively updating the historical account data with one or both of the first graph and the second graph based at least in part on the first signal and the second signal, respectively.

8. The method of claim 1, further comprising:
determining a combination of attributes having the greatest predictive accuracy based at least in part on the selecting.

9. The method of claim 1, wherein forming the plurality of components comprises:
performing component analysis on each of the edges in the first graph to form groups of interconnected nodes, wherein the nodes within each of the groups are not connected to nodes in other groups.

10. The method of claim 1, wherein analyzing the plurality of components comprises:
training a model of historical account data based on the plurality of components; and
determining whether one or more features of the plurality of components provide an accurate prediction of the fraudulent accounts.

11. The method of claim 10, wherein the one or more features indicate a percentage of the nodes in a respective component associated with a fraudulent account.

12. The method of claim 1, further comprising:
comparing the first graph with the second graph to generate a modelling difference, wherein selecting the one of the first graph or the second graph is further based on the modelling difference.

13. A computing system for identifying fraudulent accounts associated with an electronic payment service, comprising:
one or more processors; and
a memory storing instructions that, when executed by the one or more processors, causes the computing system to perform operations including:
retrieving, by an interface, a data set for each corresponding account of a plurality of accounts from a database, each data set including a plurality of attributes of the corresponding account;
selecting, by an attribute selection engine, a first set of attributes from the plurality of attributes;
constructing, by a graph modeling engine, a first graph including a plurality of nodes linked together by a multitude of edges based on the first set of attributes, wherein each of the nodes identifies a one of the accounts, and each edge of the multitude of edges indicates one or more of the first set of attributes common to a corresponding pair of accounts;
forming a plurality of components in the first graph, each component of the plurality of components including a group of nodes connected to each other by a corresponding group of edges;
providing the plurality of components of the first graph to a machine learning engine including one or more seeded machine learning models, wherein the one or more seeded machine learning models are seeded with historical account data indicating one or more of types of component structures or types of attributes in previously generated network graphs found to predict one or more historical accounts from a plurality of historical accounts as fraudulent;
analyzing, by the one or more seeded machine learning models, the plurality of components of the first graph to generate a first signal indicating a likelihood of the first graph to identify fraudulent accounts from the plurality of accounts, wherein the first signal indicates:
an accuracy with which the first graph identifies the fraudulent accounts; and
a first coverage of the plurality of accounts by the first graph;
comparing the first signal with a second signal indicating the likelihood of a second graph to identify the fraudulent accounts from the plurality of accounts, wherein the second graph is based on a second set of attributes different than the first set of attributes and wherein the second signal indicates:
an accuracy with which the second graph identifies the fraudulent accounts; and
a second coverage of the plurality of accounts by the second graph;
selecting one of the first graph or the second graph, based on the comparing, to predict whether any of the plurality of accounts is fraudulent; and
outputting, by the interface of the computing device, one or more of:
a configuration of the selected network graph;

an indication of an accuracy with which the selected network graph identifies the fraudulent accounts and a coverage of the plurality of accounts by the selected network graph;

a prediction of one or more candidate accounts from the plurality of accounts as fraudulent based on the selected network graph; or an indication of one or more accounts from the plurality of accounts and that are associated with the one or more candidate accounts.

14. The system of claim 13, wherein the one or more attributes includes one or more of a common phone number, a common email address, a common mailing address, a common bank account number, a common IP address, a common social security number (SSN), a common tax ID, or a common age of the account.

15. The system of claim 13, wherein execution of the instructions causes the system to derive the second graph by performing operations comprising:

removing one or more attributes from the first set of attributes or replacing one or more attributes of the first set of attributes with one or more other attributes to form the second set of attributes; and constructing a second graph including a plurality of nodes linked together by a multitude of edges each indicating one or more of the second set of attributes common to a corresponding pair of accounts.

16. The system of claim 13, wherein execution of the instructions causes the system to perform operations further comprising:

determining a combination of attributes having the greatest predictive accuracy based at least in part on the selecting.

17. The system of claim 13, wherein execution of the instructions for analyzing the plurality of components causes the system to perform operations further comprising:

training a model of historical account data based on the plurality of components; and determining whether one or more features of the plurality of components provide an accurate prediction of fraudulent accounts, wherein the one or more features indicate a percentage of the nodes in a respective component associated with a fraudulent account.

18. A non-transitory computer-readable medium storing instructions that, when executed by one or more processors of an apparatus, cause the apparatus to identify fraudulent accounts associated with an electronic payment service by performing operations comprising:

retrieving, by an interface, a data set for each corresponding account of a plurality of accounts from a database, each data set including a plurality of attributes of the corresponding account;

selecting, by an attribute selection engine, a first set of attributes from the plurality of attributes;

constructing, by a graph modeling engine, a first graph including a plurality of nodes linked together by a multitude of edges based on the first set of attributes, wherein each of the nodes identifies a one of the accounts, and each edge of the multitude of edges indicates one or more of the first set of attributes common to a corresponding pair of accounts;

forming a plurality of components in the first graph, each component of the plurality of components including a group of nodes connected to each other by a corresponding group of edges;

providing the plurality of components of the first graph to a machine learning engine including one or more seeded machine learning models, wherein the one or more seeded machine learning models are seeded with historical account data indicating one or more of types of component structures or types of attributes in previously generated network graphs found to predict one or more historical accounts from a plurality of historical accounts as fraudulent;

analyzing, by the one or more seeded machine learning models, the components of the first graph to generate a first signal indicating a likelihood of the first graph to identify fraudulent accounts from the plurality of accounts, wherein the first signal indicates:

an accuracy with which the first graph identifies the fraudulent accounts; and a first coverage of the plurality of accounts by the first graph;

comparing the first signal with a second signal indicating the likelihood of a second graph to identify the fraudulent accounts from the plurality of accounts, wherein the second graph is based on a second set of attributes different than the first set of attributes and wherein the second signal indicates:

an accuracy with which the second graph identifies the fraudulent accounts; and a second coverage of the plurality of accounts by the second graph;

selecting one of the first graph or the second graph, based on the comparing, to predict whether any of the plurality of accounts is fraudulent; and outputting, by the interface of the computing device, one or more of:

a configuration of the selected network graph;

an indication of an accuracy with which the selected network graph identifies the fraudulent accounts and a coverage of the plurality of accounts by the selected network graph;

a prediction of one or more candidate accounts from the plurality of accounts as fraudulent based on the selected network graph; or an indication of one or more accounts from the plurality of accounts and that are associated with the one or more candidate accounts.

* * * * *